United States Patent [19]

Colimitra

[11] Patent Number: 4,683,772
[45] Date of Patent: Aug. 4, 1987

[54] HAND GEAR TRAIN WITH THREE DEGREES OF FREEDOM

[75] Inventor: Thomas A. Colimitra, Monroe, Conn.

[73] Assignee: Westinghouse Electric Corp., Pittsburgh, Pa.

[21] Appl. No.: 758,931

[22] Filed: Jul. 25, 1985

[51] Int. Cl.$^4$ .............................................. B25J 17/02
[52] U.S. Cl. ...................................... 74/479; 74/417; 74/665 C; 901/26; 901/29
[58] Field of Search ............. 414/735, 744 R; 901/26, 901/29; 74/665 B, 665 C, 417, 479

[56] References Cited

U.S. PATENT DOCUMENTS 3,922,930  12/1975  Fletcher et al. .................. 74/665 B
4,402,234   9/1983  Malarz ............................. 901/29 X

FOREIGN PATENT DOCUMENTS 0108569  5/1984  European Pat. Off. ............. 901/29

Primary Examiner—Robert J. Spar
Assistant Examiner—Donald W. Underwood
Attorney, Agent, or Firm—Thomas R. Trempus

[57] ABSTRACT

A remotely operated hand gear train for the orientation of an end effector has an external housing mounted onto a robot arm and defines a first axis $A_1$. A first housing is rotatably mounted within the external housing for movement about the first axis $A_1$ and defines therein a second axis $A_2$ which is substantially perpendicular to the first axis $A_1$. A second housing is rotatably mounted in the first housing for rotation about the second axis $A_2$ and defines therein an axis $A_3$ which is normal to axis $A_2$ and radially spaced from axis $A_1$. A third housing is rotatably mounted in the second housing for rotation about axis $A_3$ and has a gear rack circumferentially disposed about the end thereof.

4 Claims, 5 Drawing Figures

HAND GEAR TRAIN WITH THREE DEGREES OF FREEDOM

BACKGROUND OF THE INVENTION

The invention is directed to industrial manipulators. More particularly, the invention is directed to a wrist for use in industrial manipulators. The improved wrist of this invention provides three degrees of freedom.

The introduction of robotics into the manufacturing facility has resulted in a demand for a variety of robotic components, such as end effectors which are gripper like devices which manipulate tools or components in the manufacturing process and wrists which can offer any number of degrees of freedom or levels of compliance. The specific application of the end effector to a given manufacturing process can require a multi-jointed, complex wrist design which provides several degrees of freedom. The dexterity of the end effector and the industrial manipulator is reflected in directional movement capabilities which are indicated as degrees of freedom.

It is an objective in the design and construction of industrial manipulators to mimic limited aspects of various human capabilities in order to improve the positional accuracy of industrial manipulators in a variety of tasks. A robot must be able to reach workpieces and tools. This requires a combination of an arm and a wrist subassembly, plus an end effector. The robot's sphere of influence is based upon the volume into which the robot's arm can deliver the wrist subassembly. A variety of geometric configurations have been studied and tried and their relative kinematic capabilities appraised. Such configurations include cartesian coordinates, cylindrical coordinates, polar coordinates and revolute coordinates. Evidently each of these configurations offers a different shape to its sphere of influence, the total volume of which depends upon arm link lengths. For different applications, different configurations may be appropriate. For example, a revolute arm might be best for reaching into a tub, while a cylindrical arm might be best suited to a straight thrust between the dies of a punch press.

In every case however, the arm carries a wrist assembly to orient its end effector as demanded by workpiece placement. Commonly, the wrist provides three articulations that offer motions labeled pitch, yaw and roll.

It should be noted that any of the arm coordinate systems requires three articulations to deliver the wrist assembly anywhere in this sphere of influence. It then requires three more articulations in the wrist for universal orientation of the end effector.

Quite often, robots are able to cope with job assignments without employing a full set of six articulations. This arises out of some symmetry in either the workpiece or the workpiece layout. For example, to move a bowling ball around in the sphere of influence requires only three articulations, because a ball is always oriented, irrespective of a gripper's orientation. More frequently, parts have one axis of symmetry, i.e. cylindrical, and this allows the robot arm to degenerate to five articulations.

Actually, five articulations are quite often adequate when the workpiece is arranged to reduce part manipulation needs. This happens, for example, when the beds of machine tools are all located parallel to one axis of a cartesian coordinate robot or on a radius of base rotation for cylindrical, polar or revolute robot arms. It may be argued that this compromising of the number of articulations is begging the question of robots versus special purpose automation. The rotor should be the universal solution, readily transferred to other applications. In this vein, reference should be made to the elegance of computer control of robot arms. Given a six articulation arm of any configuration, software can permit a program to be generated in cartesian coordinates irrespective of the choice of articulations. Indeed, the software can be powerful enough to think only in tool coordinates. That is, the programmer concerns himself with the tool on the end of the robot arm. He can think in terms of the tool's frame of reference and computer subroutines automatically make the various articulations move so as to accomplish the desired tool manipulation.

It is therefore an object of this invention to provide a hand gear train for use with an industrial manipulator. It is a further object of this invention to provide a hand gear train that provides more accurate positioning with three degrees of freedom.

It is yet another object of this invention to provide a hand gear train with three degrees of freedom which is readily adaptable to existing robots and robotic systems. It is still another object of this invention to provide a hand gear train which utilizes unique bearing placement and simplified bearing construction to provide a dimensionally smaller hand gear train which can be both easily upscaled and downscaled.

SUMMARY OF THE INVENTION

The invention provides a remotely operated hand gear train for the orientation of an end effector mounted at one end of a hand gear train. The invention comprises an external housing adapted to be mounted onto a robot arm. The housing defines a first axis $A_1$. A first housing is rotatably mounted within the external housing for movement about the first axis $A_1$. The first housing defines therein a second axis $A_2$ which is substantially perpendicular to the first axis $A_1$. A second housing is rotatably mounted in the first housing for rotation about the second axis $A_2$. The second housing defines therein an axis $A_3$ which is normal to axis $A_2$ and radially spaced from axis $A_1$. A third housing is rotatably mounted in the second housing for rotation about axis $A_3$. The third housing has a gear rack circumferentially disposed about the end thereof. A first drive system for effecting the rotation of the first housing about the first axis $A_1$ comprises gear means disposed about the first housing and gear drive means operatively associated therewith. A second drive system for effecting rotational movement of the second housing about the second axis $A_2$ comprises a first gear means with a first gear rack and a second gear rack concentrically disposed about one end of the first axis $A_1$ within the housing. Gear drive means are operatively associated with the first gear rack. The second housing includes gear means disposed thereabout and the second rack is operatively associated therewith such that rotation of the gear drive means is effected thereby. A third drive system for effecting rotational movement of the third housing about the third axis $A_3$ comprises gear means rotatably mounted about the other end of the first axis $A_1$. The third drive system includes a first gear rack and a second gear rack. A third gear drive means is operatively associated with the first gear rack and a drive shaft having a first gear rack at one end and a second gear rack at the other end is rotatably mounted within the second housing about the second axis $A_2$. The gear means second rack is operatively associated with the gear rack and the second gear rack is operatively associated with the third housing gear rack.

BRIEF DESCRIPTION OF THE DRAWINGS

The above as well as other features and advantages of the present invention can be appreciated through consideration of the detailed description of the invention in conjunction with the several drawings in which.

DETAILED DESCRIPTION OF THE INVENTION

Figure 1:
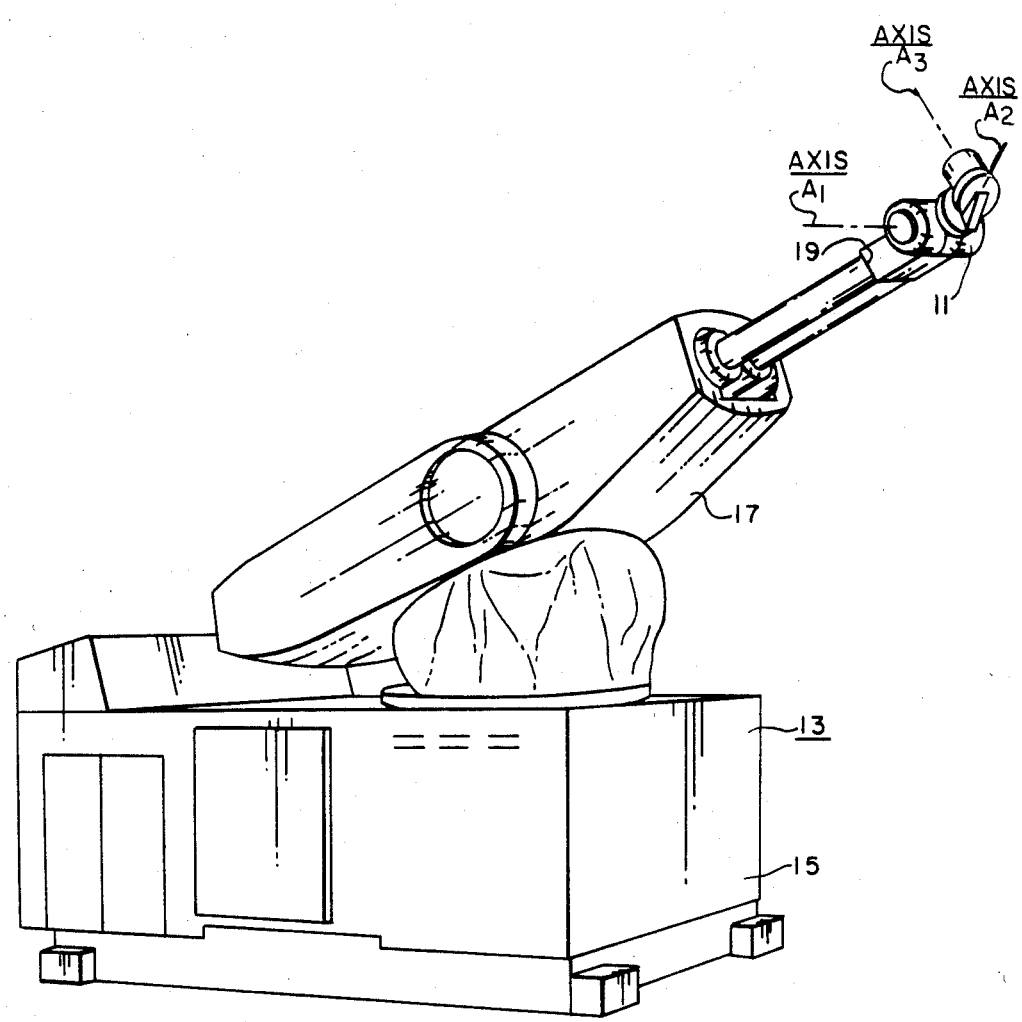
FIG. 1 is a perspective view of an industrial manipulator incorporating the hand gear train according to this invention therewith.

A hand gear train generally indicated by the reference character 11, is shown in FIG. 1 mounted at the end of an arm of a Unimate Series 2000 industrial robot generally indicated by the reference character 13. The hand gear train 11 provides three degrees of freedom as indicated by the axes designated $A_1$, $A_2$ and $A_3$. The Unimate Series 2000 robot 13 is but a single example of any one of a variety of robots onto which the hand gear train of this invention can be mounted. The robot 13 is designated for welding, adhesive or sealant deposition, machine loading, inspection and a variety of other material handling applications. The robot 13 is secured to a work area by means of base member 15 and includes an arm 17 mounted onto the base member 15. As can be seen from FIG. 1, the hand gear train 11 is operably mounted on the free end of the arm 17 as at 19.

Figure 2:
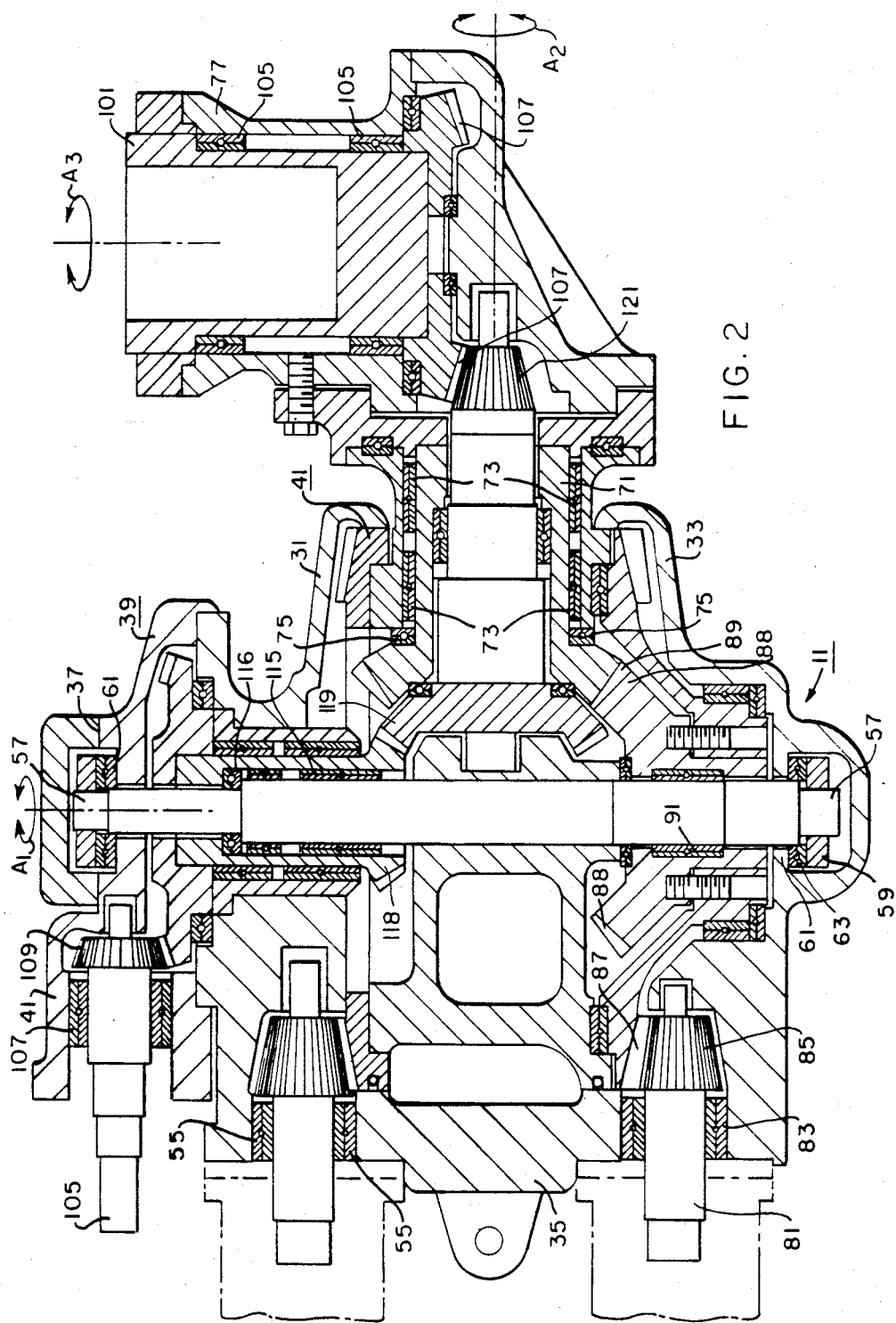
FIG. 2 is a sectional view of the hand gear train of this invention illustrating the various axes of motion and the drive means by which this motion is effected.
Figure 3:
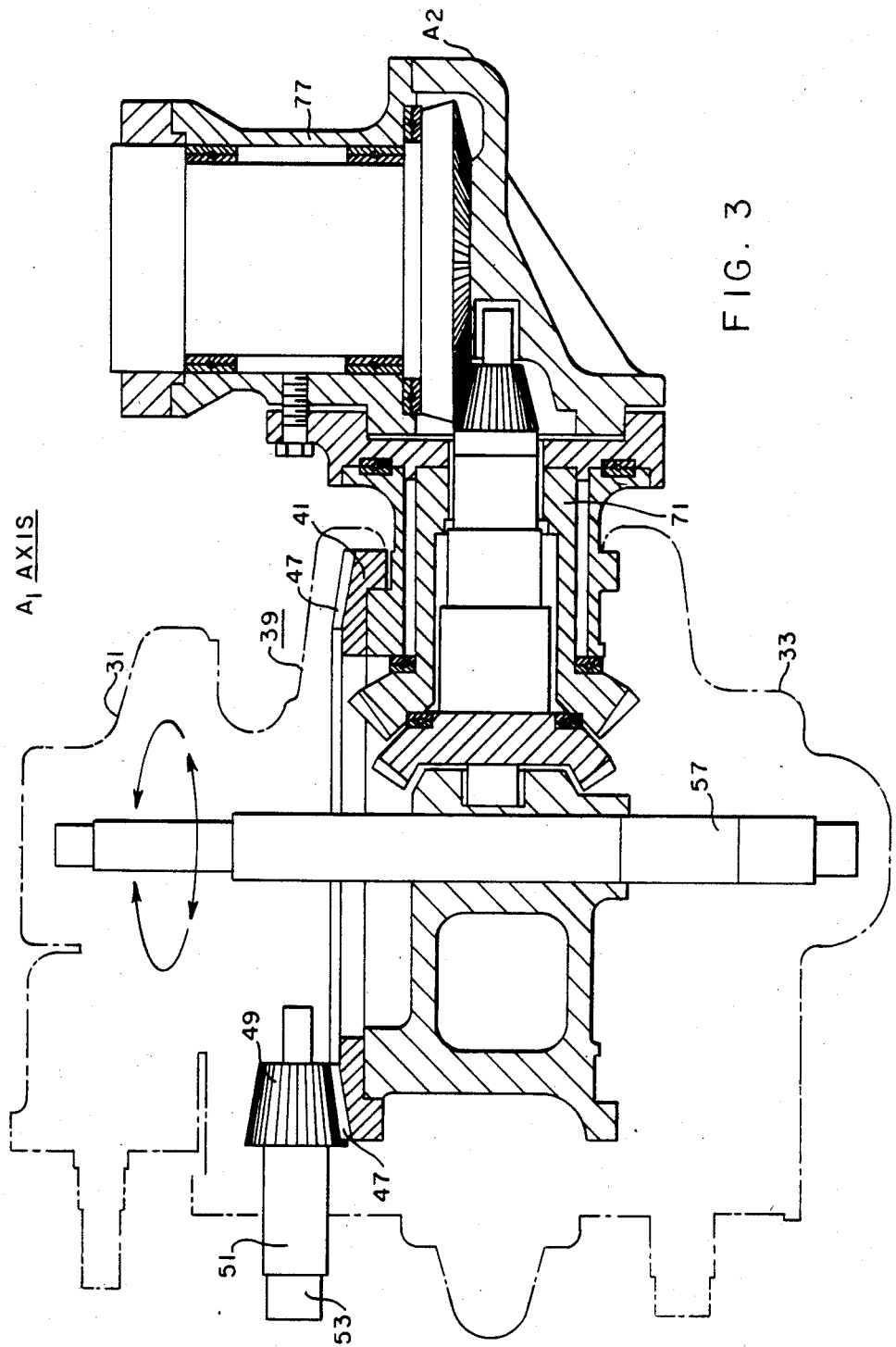
FIG. 3 is a schematical representation of the hand gear train of this invention illustrating the gears and drive shafts associated with the $A_1$ axis.
Figure 4:
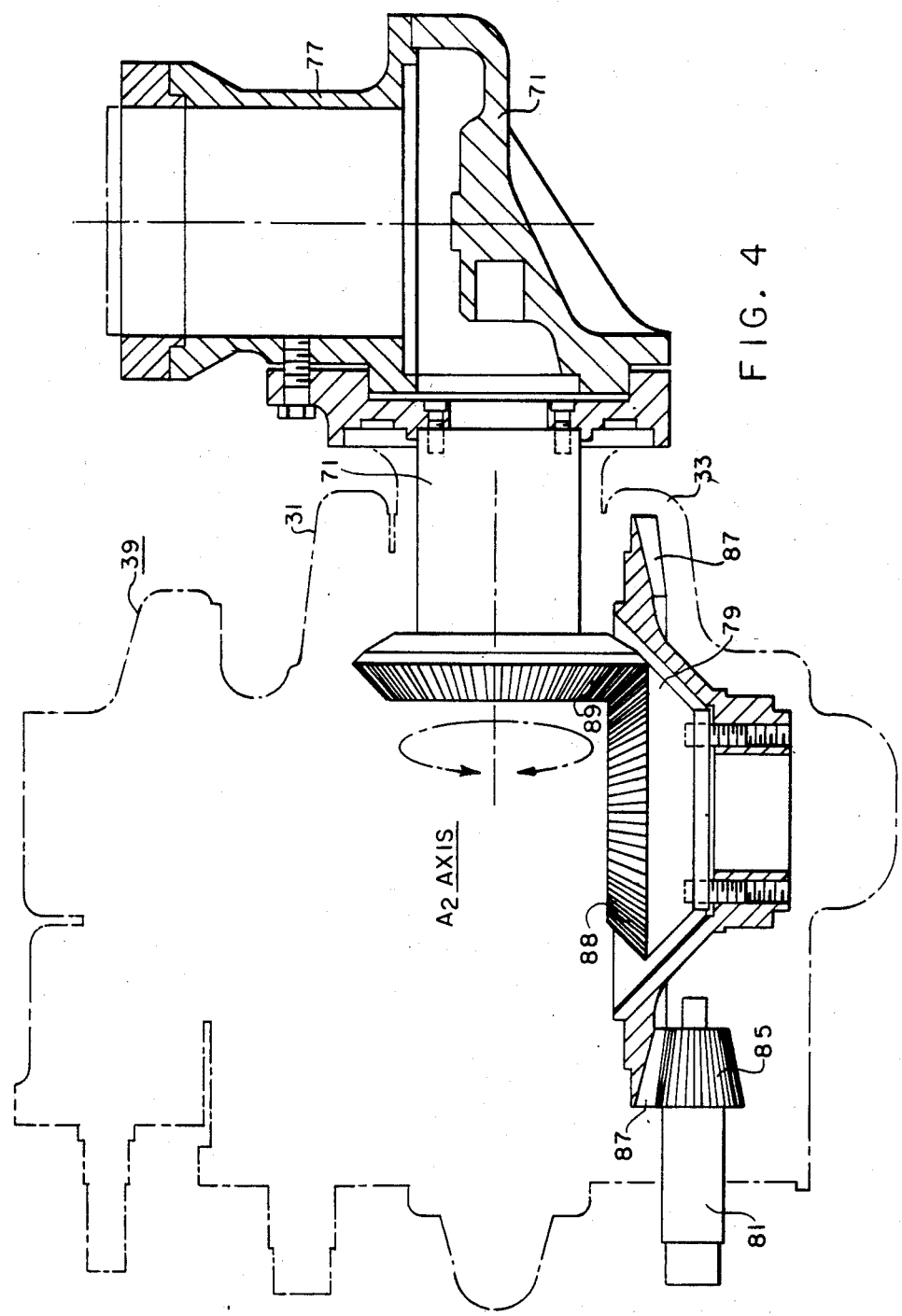
FIG. 4 is a schematical representation of the hand gear train of this invention illustrating the gears and drive shafts associated with motion about the $A_2$ axis.
Figure 5:
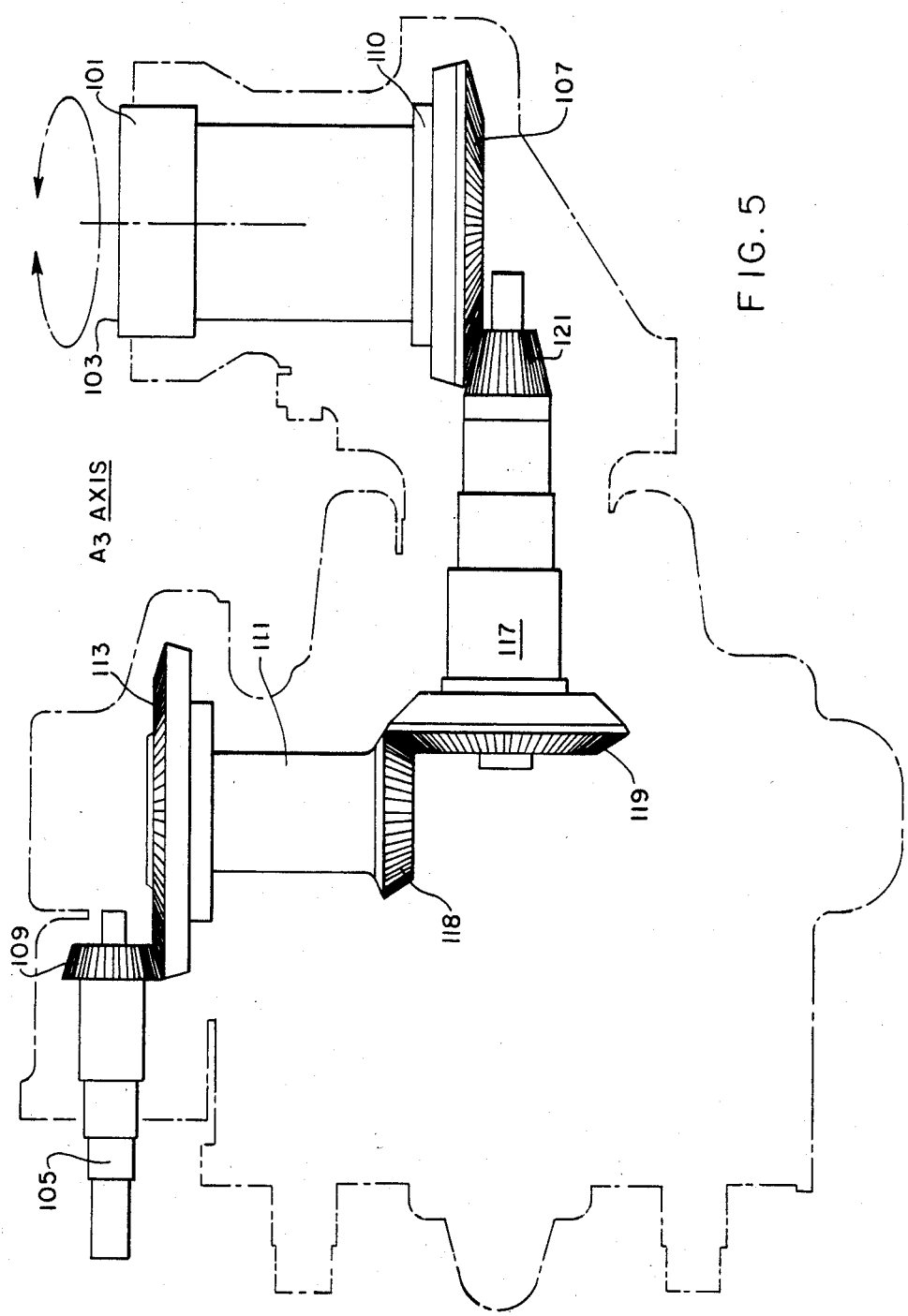
FIG. 5 is a schematical representation of the hand gear train of this invention illustrating the gears and drive shafts which affect motion about the $A_3$ axis.

Considering now FIGS. 2, 3, 4 and 5 the construction and operational capabilities of the hand gear train 11 are described with respect to the axes of motion incorporated therewith. More specifically, FIGS. 3, 4 and 5 are individually dedicated to axes $A_1$, $A_2$ and $A_3$, respectively while FIG. 2 illustrates a sectional view of the hand gear train in which the cooperation of the various subsystems is shown in detail. As can be seen axes $A_1$ and $A_3$ are perpendicular to axis $A_2$ and are in a spaced relationship with respect to each other. The hand gear train housing which defines the several axes of motion and encloses the various drive means associated with the hand gear train includes a housing right half and a housing left half 31 and 33, respectively. A further portion of the housing provides a robot arm interface as at 35. A housing cover 37 is fixedly secured to the housing right half 31 in order to enclose the $A_3$ axis drive pinion which will be described in detail hereinafter. The several housing components 31, 33, 35 and 37 generally comprise an external housing collectively indicated by the reference character 39 and defining therein a first axis $A_1$ which is substantially perpendicular to the arm 19 of the robot to which the housing is attached.

A first housing generally indicated by the reference character 41 is rotatably mounted within the external housing 39 for rotation about the first axis $A_1$. The housing 41 is mounted by means of bearing sets for rotation within the housing 39. The housing 41 includes a geared portion 47 which cooperates with the geared portion 49 of the drive pinion 51. Rotational movement is imparted to the drive pinion 51 by a conventional drive take off from the robot schematically indicated at the reference character 53. The drive pinion 51 is supported within the housing 39 by several bearing sets indicated at 55. The first housing 41 defines therein the second axis $A_2$ which is substantially perpendicular to axis $A_1$. Thus, as the drive pinion rotates and drives the through gears 49 and 47 the first housing 41, the hand gear train rotates about axis $A_1$. Rotation can be effected in either direction and is typically limited to approximately 270° in order to avoid interference with the robot arm 19 by the hand gear train. The housing 41 includes a center shaft member 47 which extends through the right and left housing portions 31 and 33 of the external housing 39. In addition to providing rigidity to the first housing 41 the center shaft 57 also serves to prevent the spreading of the right and left housing halves 31 and 33 during gear train operation. As can be seen, each end of shaft 57 includes a cap portion 59 between which cap portion 59 and the housing portion 61 adjacent thereto are disposed thrust bearings 63. This configuration in which the shaft extends beyond the housing portions and includes bearings disposed between the external portion of the housing and the ends of each shaft tends to eliminate any problems previously encountered due to the spreading of the external housing 39.

A second housing 71 is rotatably mounted within the first housing 41 for rotation about the second axis $A_2$ defined by the first housing 41. The second housing 71 defines therein a third axis $A_3$ which is normal to axis $A_2$ and in a spaced relationship with axis $A_1$. The second housing 71 has a hollow inner portion which is adapted to receive the drive means and third housing for rotation about axis $A_3$ which will be described hereinafter. The first housing portion 41 supports the second housing 71 therewithin by means of bearing sets 73 and 75. The portion of the housing 71 furthest from the center shaft 57 includes an extended housing portion as at 77 which is adapted to receive therein the third housing 101. The portion 77 of the second housing 71 is capable of 360° of rotation about axis $A_2$ due to drive motion imparted to the housing portion 71 by means of the gear 79 mounted for rotation about shaft 57 and the drive pinion 81. The drive pinion 81 is mounted in the external housing 39 by means of bearing sets 83. A geared face 85 of the drive pinion 81 is in communication with a first geared section 87 of the gear means 79. The gear 79 also has a second toothed portion at 87 which is in mechanical communication with the geared portion 89 of the second housing 71. Here again, proper bearing support is provided as at 91 for the gear member 79 to permit rotational movement with respect to the shaft 57 of the first housing 41.

The third housing 101 is rotatably mounted within the second housing portion 77 for rotation about axis $A_3$ defined by the third housing portion 77. Typically, the third housing 101 would be adapted to receive at the outside face 103 thereof, an end effector or appropriate tool for use in a desired application. Such a tool could be fixedly attached to the face portion 103 of the third housing 101 or removably mounted thereon for tool selection in a robotic system. The third housing 101 is mounted for rotation within the second housing member 77 by means of bearings 105. A geared face 107 is disposed on the inside face 110 of the third housing 101. Rotational movement of the third housing 101 about the axis $A_3$ is effected by means of a drive system. The drive system consists of drive pinion 105 mounted in the external housing 41 of the gear hand train. The drive pinion 105 which is supported within the external housing 41 by means of bearings 107 includes a gear portion 109 which is in direct mechanical communication with geared shaft 111. The geared shaft 111 includes a first geared portion as at 113 which is in communication with the drive pinion 105 gear set 109 and a second geared portion at the other end thereof 118. The shaft 111 is rotatably mounted about the center shaft 57 of the first housing 41 and supported thereon by means of bearings 115. Additional bearings as at 116 are disposed between the outside portion of the geared shaft 111 and the inner portion of the external housing 41. The gear portion 118 of the shaft 111 is in communication with a center drive shaft 117 by means of geared portion 119 of the shaft 117. The shaft 117 is disposed along the second axis $A_2$. At the end of the shaft 117 which extends away from the central shaft 57 is a gear portion 121 which is in communication with the gear portion 107 of the third housing 101. Accordingly as the drive pinion 105 rotates, shaft 111 concentrically mounted with the shaft 57 along axis $A_1$ is rotated. The rotation of shaft 111 effects the rotation of pinion 117 which is coaxial with axis $A_2$. The rotation of pinion 117 effects the rotation of the third housing portion 101 about axis $A_3$.

What has been described is a remotely operated hand gear train which orients an end effector mounted at one end of three interconnected drive means and housings. The hand gear train has two sets of concentric shafts with individual shafts that engage at an angle of 90°. The third connected drive shaft is not a set of concentric shafts. The preferred embodiment has the axis of the two sets intersecting at a single point and permits the rotation of two axes relative to each other by the combined movement of the connected drive shafts.

I claim:

1. A remotely operated hand gear train for the orientation of an end effector mounted at one end thereof comprising:
    an external housing adapted to be mounted onto a robot arm, said housing defining a first axis $A_1$;
    a first housing rotatably mounted within said external housing for rotation about said first axis $A_1$, said first housing defining therein a second axis $A_2$ which is substantially perpendicular to said axis $A_1$;
    a second housing rotatably mounted in said first housing for rotation about axis $A_2$, said second housing defining therein an axis $A_3$ which is normal to axis $A_2$ and radially spaced from axis $A_1$;
    a third housing rotatably mounted in said second housing for rotation about axis $A_3$, said third housing having a gear rack circumferentially disposed about the end thereof;
    a first drive system for effecting the rotation of said first housing about said axis $A_1$ comprising gear means disposed about said first housing and gear drive means engaged therewith;
    a second drive system for effecting rotational movement of said second housing about said axis $A_2$ comprising first gear means with a first gear rack and a second gear rack concentrically disposed about one end of said axis $A_1$ within said external housing, gear drive means engaged with said first gear rack and wherein said second housing includes gear means disposed thereabout and said second rack is engaged therewith such that rotation of said gear drive means is effected;
    a third drive system for effecting rotational movement of said third housing about said axis $A_3$ comprising gear means rotatably mounted about the other end of said axis $A_1$ and having a first gear rack and a second gear rack, third gear drive means engaged with said first gear rack, a drive shaft having a first gear rack at one end and a second gear rack at the other end rotatably mounted within said second housing about said axis $A_2$, said gear means second rack being engaged with said drive shaft first gear rack and said drive shaft second gear rack being engaged with said third housing gear rack.

2. A hand gear train comprising:
    an external housing adapted to be mounted onto a robot arm, said housing defining a first axis $A_1$;
    a first housing rotatably mounted within said external housing for rotation about said first axis $A_1$, said first housing defining therein a second axis $A_2$ which is substantially perpendicular to said axis $A_1$;
    a second housing rotatably mounted in said first housing for rotation about axis $A_2$, said second housing defining therein an axis $A_3$ which is normal to axis $A_2$ and radially spaced from axis $A_1$;
    a third housing rotatably mounted in said second housing for rotation abut axis $A_3$, said third housing having a gear rack circumferentially disposed about the end thereof;
    a first drive system for effecting the rotation of said first housing about said axis $A_1$ including gear means disposed about said first housing and gear drive means engaged therewith;
    a second drive system for effecting rotational movement of said second housing about said axis $A_2$ comprises first gear means with a first gear rack and a second gear rack concentrically disposed about one end of the axis $A_1$ within said external housing, gear drive means engaged with said first gear rack, wherein said second housing includes gear means disposed thereabout and said second rack is engaged therewith such that rotation of said gear drive means is effected;
    a third drive system for rotational movement of said third housing about said axis $A_3$ engaged therewith;
    wherein independent rotation of each of said housings about their respective axes with respect to said external housing is effected by the aforesaid drive systems.

3. In combination with a robot including arm means for positioning an end effector within a work envelope of said robot, a remotely operated hand gear train for the orientation of said end effector mounted at one end of the robot arm, said remotely operated hand gear train comprising:
    an external housing adapted to be mounted onto a robot arm, said housing defining a first axis $A_1$;
    a first housing rotatably mounted within said external housing for rotation about said first axis $A_1$, said first housing defining therein a second axis $A_2$ which is substantially perpendicular to said axis $A_1$;

a second housing rotatably mounted in said first housing for rotation about axis $A_2$, said second housing defining therein in axis $A_3$ which is normal to axis $A_2$ and radially spaced from axis $A_1$;

a third housing rotatably mounted in said second housing for rotation about axis $A_3$, said third housing having a gear rack circumferentially disposed about the end thereof;

a first drive system for effecting the rotation of said first housing about said axis $A_1$ comprising gear means disposed about said first housing and gear drive means engaged therewith;

a second drive system for effecting rotational movement of said second housing about said axis $A_2$ comprising first gear means with a first gear rack and a second gear rack concentrically disposed about one end of said axis $A_1$ within said external housing, gear drive means engaged with said first gear rack and wherein said second housing includes gear means disposed thereabout and said second rack is engaged therewith such that rotation of said gear drive means is effected;

a third drive system for effecting rotational movement of said third housing about said axis $A_3$ comprising gear means rotatably mounted about the other end of said axis $A_1$ and having a first gear rack and a second gear rack, third gear drive means engaged with said first gear rack, a drive shaft having a first gear rack at one end and a second gear rack at the other end rotatably mounted within said second housing about said axis $A_2$, said gear means second rack being engaged with said drive shaft first gear rack and said drive shaft second gear rack being engaged with said third housing gear rack.

4. In combination with a robot including arm means for positioning an end effector within a work envelope of said robot, a remotely operated hand gear train for the orientation of said end effector mounted at one end of the robot arm, said remotely operated hand gear train comprising:

an external housing adapted to be mounted onto a robot arm, said housing defining a first axis $A_1$;

a first housing rotatably mounted within said external housing for rotation about said first axis $A_1$, said first housing defining therein a second axis $A_2$ which is substantially perpendicular to said axis $A_1$;

a second housing rotatably mounted in said first housing for rotation about axis $A_2$, said second housing defining therein an axis $A_3$ which is normal to axis $A_2$ and radially spaced from axis $A_1$;

a third housing rotatably mounted in said second housing for rotation abut axis $A_3$, said third housing having a gear rack circumferentially disposed about the end thereof;

a first drive system for effecting the rotation of said first housing about said axis $A_1$ including gear means disposed about said first housing and gear drive means engaged therewith;

a second drive system for effecting rotational movement of said second housing about said axis $A_2$ comprises first gear means with a first gear rack and a second gear rack concentrically disposed about one end of the axis $A_1$ within said external housing, gear drive means engaged with said first gear rack, wherein said second housing includes gear means disposed thereabout and said second rack is engaged therewith such that rotation of said gear drive means is effected;

a third drive system for effecting rotational movement of said third housing about said axis $A_3$ engaged therewith;

wherein independent rotation of each of said housings about their respective axes with respect to said external housing is effected by the aforesaid drive systems.

* * * * *